United States Patent [19]

Ejebe et al.

[11] Patent Number: 5,745,368
[45] Date of Patent: Apr. 28, 1998

[54] METHOD FOR VOLTAGE STABILITY ANALYSIS OF POWER SYSTEMS

[75] Inventors: Gabriel C. Ejebe; Jianzhong Tong, both of Plymouth, Minn.

[73] Assignee: Siemens Energy & Automation, Inc., Alpharetta, Ga.

[21] Appl. No.: 625,053

[22] Filed: Mar. 29, 1996

[51] Int. Cl.$^6$ ............................................. G05F 1/10
[52] U.S. Cl. .......................... 364/483; 307/102; 324/602
[58] Field of Search .............................. 364/492, 483; 307/102, 132 EA; 361/59, 111; 324/602, 609, 618

[56] References Cited

U.S. PATENT DOCUMENTS

| | | | |
|---|---|---|---|
| 5,483,462 | 1/1996 | Chaing | 364/492 |
| 5,517,422 | 5/1996 | Ilic et al. | 364/483 |
| 5,566,085 | 10/1996 | Marceau et al. | 364/483 |

Primary Examiner—Ellis B. Ramirez
Assistant Examiner—Thomas Peeso

[57] ABSTRACT

A method for Voltage Stability Analysis of a bulk power supply system is taught. Briefly stated, a computationally efficient method is disclosed which is appropriate for low and high voltage applications as well as differing types of loads and load changes, i.e. reactive or otherwise, and which is usable with a multitude of different bulk power supply system systems. More particularly, a nose point of a curve for which MVAr, MW or MVA distances to voltage are calculated, using a generalized curve fit in order to compute an equivalent or surrogate nose point. This is done by approximating a stable branch and creating a voltage versus power curve, determining a plurality of stable equilibrium points on the curve, using the plurality of determined stable equilibrium points to create and fit an approximate stable branch, calculating an approximate voltage collapse point and thereafter a voltage collapse index.

6 Claims, 2 Drawing Sheets

METHOD FOR VOLTAGE STABILITY ANALYSIS OF POWER SYSTEMS

FIELD OF THE INVENTION

This invention relates, generally, to the analysis of voltage stability in a power system and more particularly to the use of contingency and ranking criteria in conjunction with a calculated model in order to more accurately perform a voltage stability analysis of a bulk power supply system.

BACKGROUND OF THE INVENTION

With the increasing use of large distributed power grids which is resultant from necessary redistributing power due to the shifting of populations and industry, it is becoming more necessary and concomitantly difficult to configure, monitor and control bulk power supply systems. This has led to a multitude of methods to model contemplated or existing bulk power supply systems. However, although modeling tools are available, existing models suffer from many deficiencies such as difficulty in use with certain configurations, overall difficulty in their use and understanding and most importantly, inaccuracy.

Further, due to the significant number of serious failures believed to have been caused by or related to voltage stability (or perhaps more correctly—instability) many utilities have conducted planning and operating studies which clearly indicate that voltage stability is a limiting operating criterion. As such, voltage stability has become one of the most important and urgent problems in modern bulk power supply systems. Hence, a central theme to different modeling approaches is the understanding of the voltage stability phenomenon and applying it to the many parts of a bulk power supply system as well as a bulk power supply system as a whole.

Voltage stability is thought of as being acceptable if within certain margins. This margin between the voltage collapse point and the current operating point is used as the voltage stability criterion. A margin to voltage collapse may be defined as the largest load change that the power system may sustain at a bus or collection of buses from a well defined operating point.

In view of the above, it is therefore necessary to develop Voltage Stability Assessment (VSA) tools in order to design, operate or modify a modern energy management systems using on-line power system voltage stability analysis. Some discussions of the usefulness of such analysis may be found in: Y. Mansour, ed. "Recommended Techniques for Voltage Stability Analysis," IEEE PES, Publication 93TH0620-5PWR, 1994; C. Taylor, "Modeling of Voltage Collapse Including Dynamic Phenomena," Report by CIGRE Task Force 38.02.10, 1993 and C. Taylor, Power System Voltage Stability, McGraw-Hill, Inc., New York, 1993 all of which are specifically incorporated by reference herein.

Further, it has been found that although existing solution methods can provide reasonable approximations, their use or results are limited to specific instances or variables and are therefore not to be considered as generalized solutions. An example of such limitations found in these methods may be low voltage solutions only or may be reliably used only to the computation of a reactive power limit to voltage collapse. Other disadvantages for existing methods are that the reactive load change is applied only at a single bus and therefore the neighboring area buses may be unrealistically stressed during actual load situation and therefore is not entirely desirable in a real-world situation. Another disadvantage of another existing method is that although an approximation may require only three power flow solutions to obtain an estimate of a MVAr loading limit, it cannot handle both active and reactive powers with simultaneous load increase on several buses, another real-world possibility and hence a significant deficiency.

Contingency screening and ranking is one of the most important components of Voltage Stability Assessment. The purpose of contingency screening and ranking is to determine which contingencies may cause power system limit violations and/or system instability according to voltage stability criteria. The goal of these methods for contingency screening and ranking is to estimate rapidly and accurately the voltage stability margin for all contingencies.

Accordingly, Voltage Stability Assessment, that is the criterion and factors to be calculated or measured and considered or taken into account, consists of or considers an operating point stability assessment of the bulk power supply system; selecting the various contingencies according to that particular system; screening and ranking these contingencies; evaluation of these contingencies and development of corrective and perhaps most importantly, preventative strategies.

It is therefore an object of the present invention to provide a more accurate voltage stability analysis and solution which is usable and accurate with a multitude of power supply systems such as, for example, low or high voltage as well as differing types of loads and load changes, i.e. reactive or otherwise. It is a further object to provide a method which is usable with a plurality of busses or which may account for simultaneous load increases on a plurality of buses.

Another object of the present invention is to develop a method which takes into account Voltage Stability Assessment as recited above. Yet another object of the present invention is a method which is computationally efficient and expedient and which is does not require analysis by additional methods in order to take into account contingencies.

Finally, it is an object to produce a method for Voltage Stability Analysis of a bulk power supply system which calculates a nose point of a curve for which MVAr, MW or MVA distances to voltage are calculated, using a generalized curve fit in order to compute an equivalent or surrogate nose point by approximating a stable branch and creating a voltage versus power curve; determining a plurality of stable equilibrium points on the curve; using the plurality of determined stable equilibrium points to create and fit an approximate stable branch; calculating an approximate voltage collapse point; and thereafter a voltage collapse index which may be used for Voltage Stability Assessment.

DESCRIPTION OF THE DRAWINGS

Reference may be now had to the following figures in which.

DETAILED DESCRIPTION OF THE PREFERRED EMBODIMENT

Preliminary to an explanation of the present invention it is appropriate to consider an overview of the application context for Voltage Stability Assessment. Further, it has been found that although existing methods for Voltage Stability Assessment are deficient, a generalized solution such as we have found, is best understood by considering such existing methods.

Therefore, an explanation and performance comparison of three existing methods for contingency selection and ranking in comparison to our new method is helpful in understanding the present invention. This comparison consider an exemplary large 'test' system using as a reference the voltage stability margins obtained with a Newton based power flow suitably extended by means of a continuation technique. In one embodiment of the present invention, the comparison was obtained by using a '234' bus power system. Additional results with this new method of ranking are presented using a '901'-bus power system.

VOLTAGE STABILITY ASSESSMENT

It is known that on-line Voltage Stability Assessment should consist of an operating point stability assessment; a contingency selection; contingency screening and ranking; contingency evaluation and development of corrective and/or preventive strategies.

Figure 1:
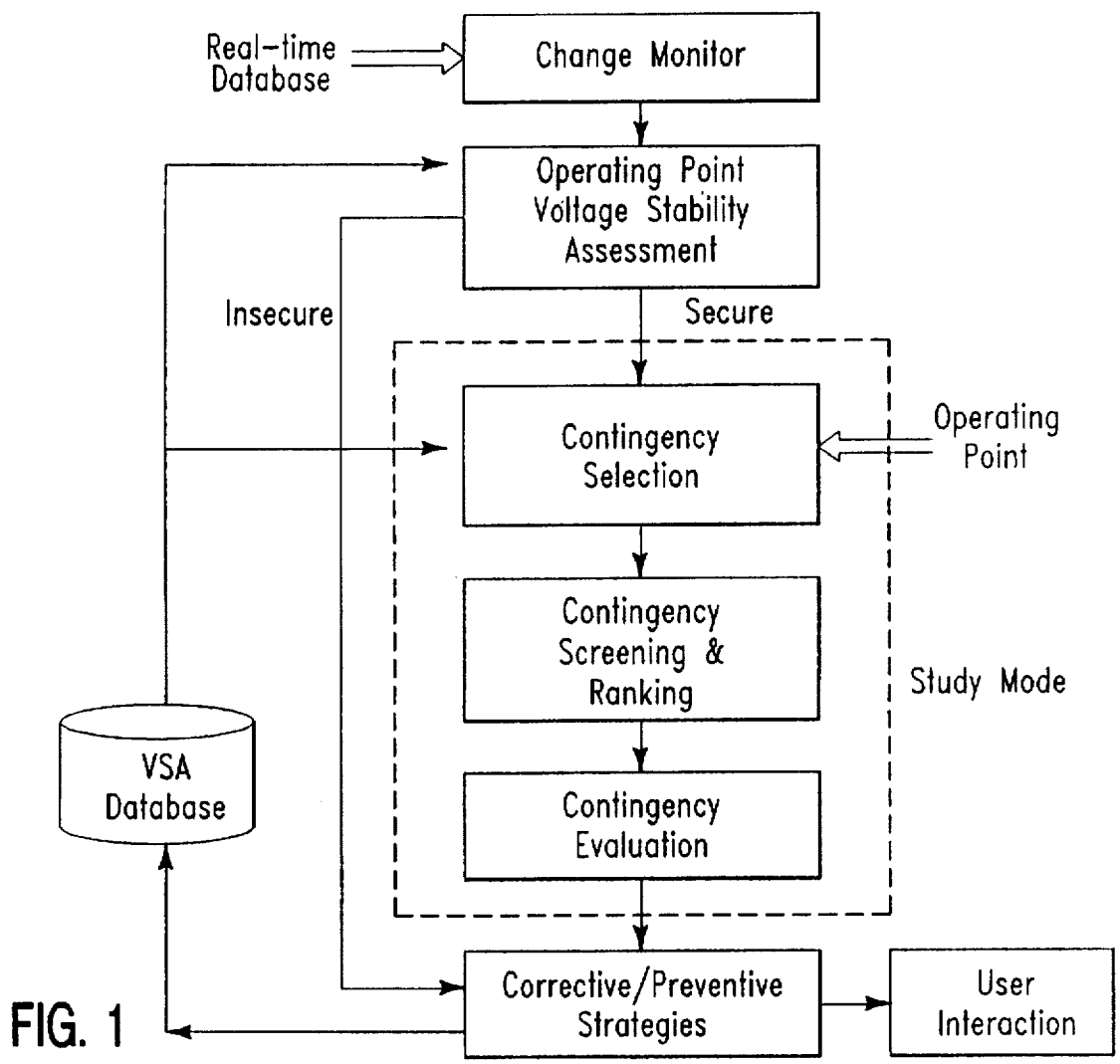
FIG. 1 is an flow chart showing the overall steps incident to Voltage Stability Assessment analysis.

Reference may be had to FIG. 1 which gives an overview of these steps and sets them in an overall application context. The Voltage Stability Assessment environment receives its input from a real time database. This input consists of the current state of the power system as determined by a state estimator. Additionally, other inputs to Voltage Stability Assessment include pertinent data required for voltage stability analysis including all the models of devices and controls found in the system. Such devices may include but not be limited to power transfer devices, power switching devices, power interruption, including overcurrent devices, transformers, impedance compensation devices as well as the various controls apparatus incident to the above.

In FIG. 1 it can be seen that the first task within the Voltage Stability Assessment environment is the assessment of the security of the current operating point from the voltage stability point of view. This can be accomplished with tools ranging from simple sensitivity analysis to complete eigensystem determination.

This assessment permits the identification of whether the operating point is secure or not. Depending on this outcome, in the preferred embodiment of the present invention, analysis proceeds with the determination of an appropriate corrective strategy, in the insecure case, or to the study mode, in the secure case. The objective of the study mode is to determine, from a large set of potential contingencies, those that may lead to voltage stability problems. It has been found that this is very useful for not only planning future systems but also to examine the weaknesses of existing systems or conversely to examine the strengths of existing systems.

The first step of the study mode consists of the selection of the contingencies to be analyzed. A contingency is defined in terms of the critical buses (points) where analysis is applied, together with the zones or areas where load changes are expected, plus the definition of applicable equipment outages. This frequently very large list of selected contingencies is then screened and ranked using fast ranking algorithms. Finally, contingencies which are flagged as potentially harmful during the screening and ranking phases are studied in detail using tools such as Continuation Power Flow (CPF) as described below.

The output of this process are limits to collapse in terms of MVA or MW load changes at selected buses, changes in interface flows, etc. In addition, as seen in FIG. 1, for those contingencies deemed to be harmful, preventive and corrective strategies may be developed in terms of control actions to be executed in either a pre-contingency, or post-contingency mode.

Two important considerations are the modeling of equipment and the choice of operating point for analysis. Both of these aspects can be incorporated in the computation of the operating points used in the analysis during a study mode. One such operating point is given by the current system condition as received from the real time system. Additional points are established by means of known quasi-dynamic simulations of the power system. A quasi-dynamic simulation should include all the appropriate modeling requirements affecting voltage behavior in the system. Equipment and load modeling considerations are also part of both the Continuation Power Flow analysis and the contingency screening and ranking steps considered in the Voltage Stability Assessment environment of FIG. 1.

METHODS OF CONTINGENCY SCREENING

Contingencies are ranked according to their margins to voltage collapse. The operating point may be obtained from a real-time operating condition or from a postulated condition computed from a system simulation. The margin is preferably measured in MVA, MW, or MVAr.

As recited above, it is appropriate to consider portions of previously known methods. Accordingly, we have found that three know methods for screening and ranking of contingencies are appropriate.

The first method is based on the determination of a complimentary Unstable Equilibrium Point (UEP) at a given load level and the prediction of the margin using both the Stable Equilibrium Point (SEP) and the Unstable Equilibrium Point (UEP) as described more full below, but which is explained in detail in A. Yokoyama and Y. Sekine, "A Static Voltage Stability Index Based on Multiple Load Flow Solutions," Proceedings of the Bulk Power System Voltage Phenomena—Voltage Stability and Security, Potosi, Mo., January 1989 which is specifically included by reference herein.

A second method is that which uses a test function concept as proposed by R. Seydel, From Equilibrium to Chaos: Practical Bifurcation and Stability Analysis, Elsevier Science Publishers, 1988, which is specifically incorporated by reference herein, which method is extended to the computation of the critical point as discussed by H. D. Chiang and R. Jean-Jumeau, "Toward a Practical Performance Index for Predicting Voltage Collapse In Electric Power Systems," IEEE/PES 93 SM 512-4 PWRS, Vancouver, BC, Jul. 18–22, 1993 which is specifically incorporated by reference herein.

A third method is an approximate method that permits the determination of the reactive power (MVAr) loadability margin at a particular bus by using a power flow approach and by fitting a third order polynomial to points in the Voltage versus Reactive Power curve as discussed by O. B. Fosso, N. Flatabo, B. Hakavik and A. T. Holen, "Comparison of Methods for Calculation of Margins to Voltage Instability," Paper APT IS-372, IEEE/NTUA, Athens Power Tech. Conference, Athens, Greece, Sep. 5–8, 1993 which is specifically incorporated by reference herein.

These methods are compared using as reference the CONTINUATION POWER FLOW [4–6]. Results obtained using this method are considered as the benchmark results. An overview of these techniques follows.

1. The Continuation Power Flow (CPF) Method

The behavior of a power system can, in general, be described by a set of differential equations of the form:

$$x = f(x, \lambda) \quad (1)$$

where x is the n-vector of state variables (voltage magnitudes and angles at all the buses), and $\lambda$ is a parameter used to represent the change in demand at all the buses in the power system. For slow variations of the parameter, the power system can be modeled by a series of steady-state solutions to e.q. (1) obtained for different values of $\lambda$. These solutions are obtained by computing the equilibrium points given by the solution to the non-linear equation:

$$f(x, \lambda) = 0 \quad (2)$$

In terms of the familiar power flow equations, the above set may be written as:

$$P_{Gi}(\lambda) - P_{Li}(\lambda) = \sum_{j \in i} V_i V_j (G_{ij} \cos\theta_{ij} + B_{ij} \sin\theta_{ij}) \text{ and} \quad (3)$$

$$Q_{Gi}(\lambda) - Q_{Li}(\lambda) = \sum_{j \in i} V_i V_j (G_{ij} \sin\theta_{ij} + B_{ij} \cos\theta_{ij}) \quad (4)$$

where $$P_{Gi}(\lambda) = P_{Gio}(1 + \lambda K_{Gi})$$

and $$P_{Li}(\lambda) = P_{Lio}(1 + \lambda K_{Li})$$

and $$Q_{Li}(\lambda) = Q_{Lio}(1 + \lambda K_{Li}).$$

$P_{Lio}, Q_{Lio}$ are the active and reactive load at bus i, and $P_{Gio}$ is the active generation at bus i in a base case.

These above power flow equations may be written more compactly as:

$$f(x, \lambda) = F(x) + \lambda b = 0 \quad (5).$$

The direction vector b represents the changes in real and reactive power demand and the changes in real power generation.

Solutions of these set of equations (eq. (5)) are used to trace both the stable and unstable branches of the voltage versus Power (or $\lambda$) curve for any particular bus voltage magnitude in the bulk power supply system. It is to be understood that in the preferred embodiment of the present invention, any power flow method can potentially, be used to solve for the state variables in the above equations given a particular load change.

To trace the complete branches of the V-versus-$\lambda$ curve, however, the use of a continuation method is required. A continuation based method consists of two steps: a predictor step, which produces an approximate solution to be used as an initial condition to the second step, the corrector step.

Figure 2:
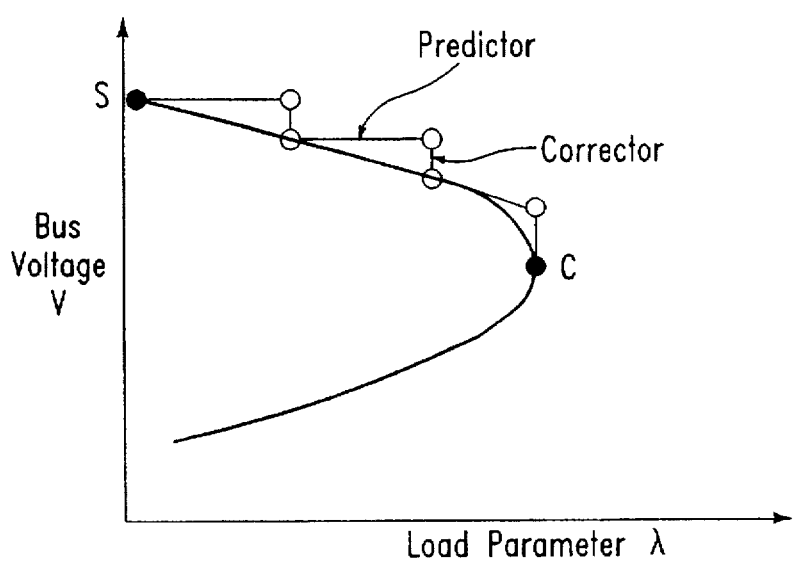
FIG. 2 shows a curve incident to a limited solution according to an existing method adaptable for limited situations only and is referred to as the Continuation Power Flow Method.

Reference may be now had to FIG. 2, which shows a curve describing these steps. Differences between continuation methods are usually due to how these steps are implemented such as may be found in V. Ajjarapu and C. Christy, "The Continuation Power Flow: A Tool for Steady State Voltage Stability Analysis," IEEE T-PS, Vol. 7, No.1, February 1992 as well as C. A. Cañizares and F. L. Alvarado, "Point of Collapse and Continuation Methods for Large AC/DC Systems," IEEE T-PS, Vol. 8, No.1, February 1993 or H. D. Chiang, A. J. Flueck, K. S. Shah and N. Balu, "CPFLOW: A Practical Tool for Tracing Power System Steady-State Stationary Behavior Due to Load and Generation Variations," IEEE/PES 94 WM 244-4 PWRD, New York, N.Y., Jan. 30–Feb. 4, 1994 all of which are specifically incorporated by reference herein.

By the successive application of the above steps one can trace the stable branch of the V-versus-P (or $\lambda$) curve to obtain point C as shown in FIG. 2. Given C the margin to collapse can therefore be obtained as the difference in the power at C and the power at the initial point S.

2. The Multiple Load Flow (MLF) Method

Figure 3:
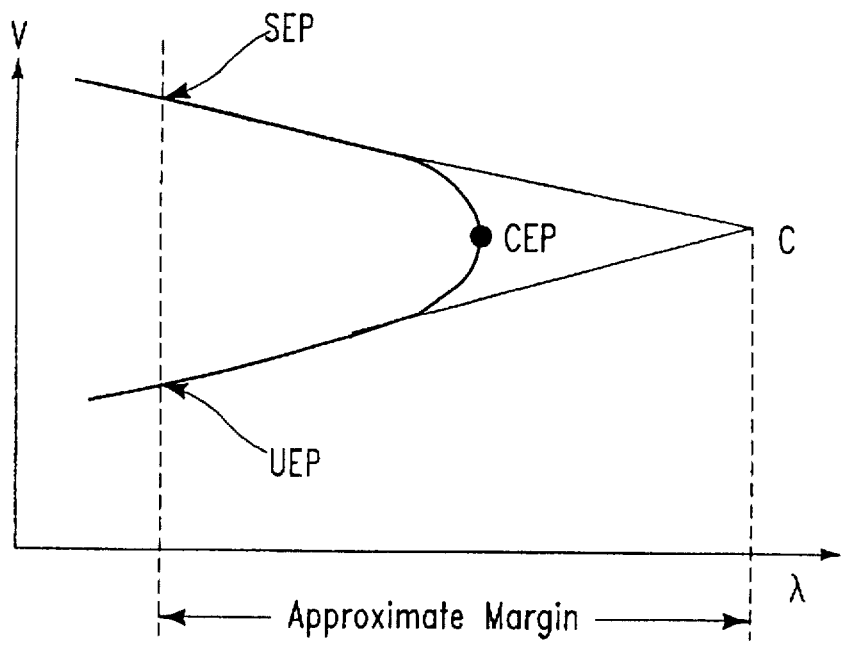
FIG. 3 is a curve indicating an approximation of a Voltage Stability Margin, computed according to a limited solution which is used for an existing method referred to as the Multiple Load Flow Method which is appropriate for limited situations.

An approximate margin to collapse can be computed using voltage gradients determined at a point on the stable equilibrium branch of the Voltage versus $\lambda$ curve (the Stable Equilibrium Point—'SEP'), and at the corresponding point on the unstable equilibrium branch (the Unstable Equilibrium Point—'UEP'), as shown in FIG. 3.

The margin shown is obtained as a first order approximation of the voltage stability margin, although for contingency screening and ranking only, the relative order of contingencies is of interest. Therefore, in the preferred embodiment of the present invention it is not necessary to predict the actual voltage collapse point. Therefore, point C in FIG. 3 is sufficient to permit the ranking of contingencies for comparison with the ranking produced by the above discussed continuation-based power flow method.

The sensitivity of the bus voltage magnitude at bus i with respect to system load change is given by:

$$\frac{\partial V_i}{\partial \lambda} = \sum_{j \in N} \left( \frac{\partial V_i}{\partial P_j} \frac{\partial P_i}{\partial \lambda} + \frac{\partial V_i}{\partial Q_j} \frac{\partial Q_i}{\partial \lambda} \right) \quad (6)$$

where $V_i$ is the voltage at bus i;

$P_i$ is the MW injection at bus i;

$Q_i$ is the MVAr injection at bus i;

$\lambda$ is the load change parameter; and

N is the number of buses.

Thereafter, we have let b be the vector defining the direction of change of the system load, such that:

$$\frac{\partial P_i}{\partial \lambda} = b_{2*i-1} \text{ and } \frac{\partial Q_i}{\partial \lambda} = b_{2*i} \quad (7)$$

and $\partial V_i/\partial P_j$ and $\partial V_i/\partial Q_j$ are elements of the inverse Jacobian matrix.

Further, we have let $m_i^{sep} = \partial V_i^{sep}/\partial \lambda$ be the voltage sensitivity at bus i computed at the Stable Equilibrium Point (SEP), and $m_i^{uep} = \partial V_i^{uep}/\partial \lambda$ be the voltage sensitivity at bus i computed at the Unstable Equilibrium Point (UEP), then the equations of the tangents to the curve V versus $\lambda$ can be computed.

From these the $\Delta\lambda$ change between the current operating point and the point of intersection of the tangents (the surrogate point of collapse) are given by:

$$\Delta\lambda = \frac{V_i^{sep} - V_i^{uep}}{m_i^{uep} - m_i^{sep}} \quad (8)$$

The basis of this Multiple Load Flow Method (MLF) is that in a heavily loaded power system, there exists two very close load flow solutions with the same P-Q or P-V values. One is for the higher voltage (Stable Equilibrium Point) solution and the other is for the lower voltage (Unstable Equilibrium Point) solution.

In order to determine the power flow solution at the Unstable Equilibrium Point, a multiple load flow calculation in polar coordinates, in the preferred embodiment of the present invention, uses a scheme such as that described in A. Yokoyama and Y. Sekine, "Multisolutions for Load Flow Problem and Their Physical Stability Test," Electrical Engineering in Japan, Vol. 100, No. 5, 1980, pp. 28–35 which is specifically incorporated by reference herein.

For a PV bus, the unknowns are the reactive power and angle. For a PQ bus, the power balance equation is manipulated to have the voltage magnitude and angle at the bus as the unknowns. The resulting quartic equation in voltage magnitude is thereafter solved. However, only two of the four possible solutions are feasible because of the requirement that the voltage magnitude be positive. One of the feasible voltage magnitudes corresponds to the Stable Equilibrium Point, the other, called the minus mode, is combined with all other bus voltages at their Stable Equilibrium Point value to form a starting point for the Unstable Equilibrium Point solution.

In the preferred embodiment of the present invention, the Unstable Equilibrium Point is computed using a Newton power flow as is known to one skilled in the art. We have found that this scheme has been reliable in finding the low voltage solutions and more robust than merely starting the power flow with the load bus of interest at some extremely depressed voltage magnitude.

3. The Test Function Method (TFM)

The test function method for the estimation of the critical value of the load parameter, $\lambda^*$, was adopted Chiang—July, 1993 as recited above which was based on the concepts introduced by Seydel as recited above. The concept of test function as discussed in Seydel is used to assure that bifurcation points are not overlooked during branch tracing (with the use of the continuation method recited above). The basic idea of the method is to use a test function $t(x,\lambda)$ to determine the existence of bifurcation points bounded by two solutions $(x_1,\lambda_1)$ and $(x_2,\lambda_2)$.

The test function proposed, and one found helpful in the preferred embodiment of the present invention is defined as:

$$t = e_l^T J(x,\lambda) v \quad (9)$$

where $e_l$ is the 1-unit vector of order n;

J is the Jacobian matrix of the system of eq. (2) above; and v is obtained from the solution to $$J_{lk} v = e_l \quad (10);$$

with $J_{lk}$ defined by:

$$J_{lk} = (I - e_l e_l^T) J + e_l e_k^T \quad (11).$$

Having considered the above, it can be shown that the proposed test function has a value of zero at the bifurcation point $\lambda^*$. This is equivalent to singularity of the Jacobian matrix at this same point.

Using this test function, there were computed approximations to the critical values of the load parameter $\lambda^*$, as follows:

$$\lambda^* = \lambda_1 - \frac{1}{2} \frac{t(x_1,\lambda_1)}{t'(x_1,\lambda_1)} \quad (12)$$

for a quartic approximation, and, $$\lambda^* = \lambda_1 - \frac{1}{4} \frac{t(x_1,\lambda_1)}{t'(x_1,\lambda_1)} \quad (13)$$

for a quartic approximation.

In the above formulas the derivative t' is computed by using a small perturbation to the parameter $\lambda$.

4. The V-Q Curve Fitting Method (VQF)

This method is described more fully in Fosso as recited above and is a fast but approximate method for the computation of limit to collapse based on power flows and curve fitting. This method, however, is only applicable to the computation of a reactive power limit to voltage collapse. It determines this limit from the V-Q curve obtained for a particular bus in the power system with respect to reactive power changes at that bus.

Figure 4:
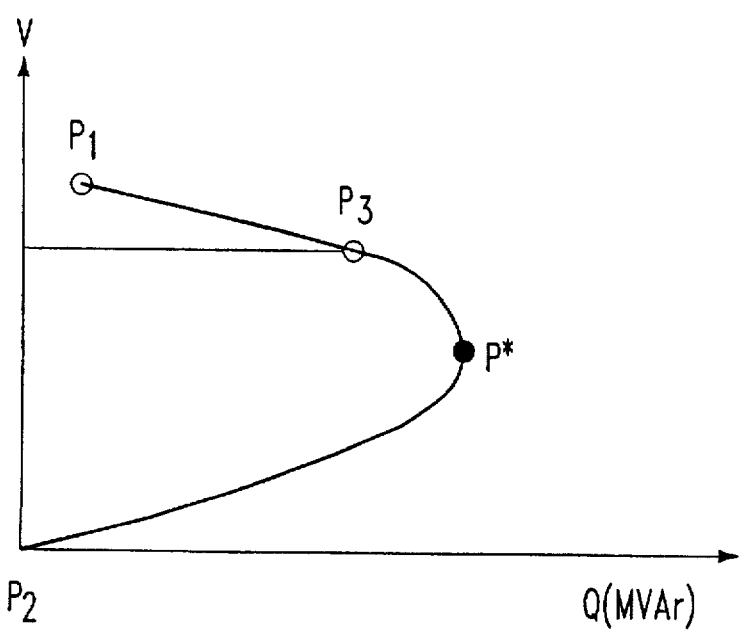
FIG. 4 is another plotted curve, similar to FIGS. 2 and 3, using a limiting but existing curve fitting method.

The basic idea of this VQF method is to use three known points in the V-Q curve and to fit an appropriate curve to these three points. In the preferred embodiment of the present invention, a cubic spline was therefore used. These three points which are used are shown in FIG. 4.

Point $P_1$ corresponds to the base case condition obtained from the state estimator. Point $P_2$ is the origin of the coordinate system (0, 0), while point $P_3$ is obtained from a power flow solution with the bus of interest treated as a PV bus with a selected voltage magnitude (e.g. 0.9 pu).

The value of reactive power Q (MVAr) obtained at the bus, together with the chosen voltage magnitude, comprise the third point. Given these three points, one skilled in the art can see that the spline can be easily computed. The value of voltage magnitude for which the reactive power is a maximum is then determined and the limit easily calculated.

However, the main disadvantage of the above described V-Q method above is that the reactive load change is applied only at a single bus and the neighboring area buses may be unrealistically stressed. Thus although the method requires only three power flow solutions to obtain an accurate estimate of the MVAr loading limit, unfortunately it cannot handle both active and reactive powers with simultaneous load increase on several buses.

5. The Preferred Embodiment: A Generalized Curve Fit (GCF)

In view of the above existing methods, we have found a new method that permits the determination of the margin for any type of load change (MVA, MW, MVAr) at any number of buses using a generalized curve fit. We have found that rather than computing and tracing the P-V or Q-V curves, an approximation to the nose of the curve is determined.

Accordingly, the method to compute the stable branch and to get an approximation to the saddle-node bifurcation point is obtained by the use of a curve fitting technique. In general, the stable branch may be approximated by a polynomial of degree n of the form:

$$\lambda = a_n x^n + \ldots + a_1 x + a_o \quad (14)$$

where the pairs $(x,\lambda)$ are solutions of eq. (2) above on the stable branch.

From considering the flow chart of FIG. 2, for one skilled in the art, it can be seen that the stable branch of the Voltage versus Power (or, in the parameter space, Voltage versus $\lambda$) curve can be approximated by a second order polynomial. To fit the desired polynomial it is sufficient to determine three Stable Equilibrium Points on the curve. One of these points is a given Stable Equilibrium Point obtained from a state estimation solution and denoted by $(x^{(1)},\lambda^{(1)})$. Two other points can then be computed by increasing the demand $\lambda$ such that $\lambda^{(3)} > \lambda^{(2)} > \lambda^{(1)}$. The points corresponding to $(x^{(2)}, \lambda^{(2)})$ and $(x^{(3)}, \lambda^{(3)})$ can thereafter be obtained using two steps of the continuation power flow (CPF) method described above and with reference to FIG. 2.

These three points $(x^{(1)}, \lambda^{(1)})$, $(x^{(2)}, \lambda^{(2)})$, $(x^{(3)}, \lambda^{(3)})$ are then used to fit the approximate stable branch:

$$\lambda_i = a_1 x_i^2 + a_2 x_i + a_3 \quad (15).$$

The constants $a_1$, $a_2$, and $a_3$, are then computed by solving the set of linear equations:

$$\lambda_i^{(1)} = a_{1i}(x_i^{(1)})^2 + a_{2i} x_i^{(1)} + a_{3i} \quad (16);$$

$$\lambda_i^{(2)} = a_{1i}(x_i^{(2)})^2 + a_{2i} x_i^{(2)} + a_{3i} \quad (17);$$

and $$\lambda_i^{(3)} = a_{1i}(x_i^{(3)})^2 + a_{2i} x_i^{(3)} + a_{3i} \quad (18).$$

Given the approximate stable branch, the approximate voltage collapse point, $x^*$, is given by:

$$x_i^* = -\frac{a_{2i}}{2a_{1i}}, i = 1, 2, \ldots, n_c. \quad (19)$$

The voltage collapse index (the load demand limit) $\lambda^*$ is:

$$\lambda^* = \left( \sum_{i=1}^{n_c} \lambda_i^* \right) / n_c, \quad (20)$$

where $$\lambda_i^* = -\frac{a_{2i}^2}{2a_{1i}} + a_{3i}, \text{ and} \quad (21)$$

with $n_c$ the number of buses where load is changed. Here it can be seen that the x in the above formulae corresponds to the state variable (voltage magnitude in this case).

Considering the above new method, we compared the performance of the ranking methods it is possible test the results on a contemplated or existing power system model with 234' buses and 442' lines. The results of such generalized tests may be seen in Table 1 below. Table 1 shows the maximum reactive power load (MVAr) on nine different buses, calculated by increasing reactive load at a single bus. The benchmark margins obtained by known Continuation Power Flow (CPF) are shown in column 3. The GCF of the present invention and the known VQF method obtain the same relative ranking as the known Continuation Power Flow (CPM) method. Further, the margins from both methods are very close in magnitude to the Continuation Power Flow margins (although for contingency screening and ranking this second aspect is not critical). It can also be seen that the ranking and capture ratio of the MLF method is satisfactory, while the performance of the TFM method is not satisfactory. Since, as previously stated, due to the limitations of the VQF method which can realistically only handle reactive power load change at a bus, it has been excluded from further comparisons.

Table 2 below summarizes these results for increases in real and reactive power. It can be seen that the GCF method of the present invention has the best performance in terms of relative ranking order as well as margin magnitudes when compared to the benchmark Continuation Power Flow results.

Additionally, numerical experiments were conducted with the GCF method of the present invention using a 901' bus equivalent model of a Midwestern United States utility. These results are shown in Table 3 which indicates the MVA margins obtained for ten specific cases. In each case the real and reactive power loads at five different buses are increased at constant power factor which shows that the result of the present inventions GCF method performs very well with respect to Continuation Power Flow.

Finally, for completeness purposes, Table 4 is used to show CPU time comparisons in order to determine computational efficiency. As can be seen, the present invention exhibits considerable advantages over Continuation Power Flow.

TABLE 1

Comparison of Reactive Power MVAr Margins
(234 buses and 442 lines system)

| Case | Bus No. | (CPF) | (MLF) | (TFM) | (VQF) | (GCF) |
|---|---|---|---|---|---|---|
| 1. | 5047 | 104.4 | 119.8 | 49.9 | 104.4 | 106.1 |
| 2. | 5062 | 122.3 | 139.9 | 43.3 | 122.8 | 123.6 |
| 3. | 5060 | 122.5 | 153.4 | 90.8 | 122.4 | 123.7 |
| 4. | 5067 | 137.2 | 177.9 | 88.2 | 136.3 | 138.1 |
| 5. | 5052 | 320.0 | 393.2 | 137.9 | 319.5 | 320.7 |
| 6. | 5065 | 477.7 | 553.7 | 139.4 | 479.3 | 485.3 |
| 7. | 5122 | 540.5 | 764.4 | 541.4 | 534.7 | 546.0 |
| 8. | 5054 | 559.2 | 633.3 | 317.6 | 561.2 | 572.6 |
| 9. | 5056 | 575.8 | 652.2 | 298.1 | 578.7 | 579.4 |

TABLE 2

Comparison of Voltage collapse MVA Margins
(234 buses and 442 lines system)

| Case | Bus No. | (CPF) | (MLF) | (TFM) | (GCF) |
|---|---|---|---|---|---|
| 1. | 5047 | 86.12 | 84.82 | 19.09 | 86.47 |
| 2. | 5060 | 105.09 | 106.34 | 40.63 | 96.81 |
| 3. | 5062 | 108.10 | 105.73 | 18.18 | 99.72 |
| 4. | 5067 | 121.00 | 123.09 | 41.10 | 109.44 |
| 5. | 5052 | 281.54 | 280.10 | 62.28 | 254.75 |
| 6. | 5054 | 462.60 | 445.81 | 136.61 | 420.99 |
| 7. | 5065 | 469.12 | 386.38 | 54.38 | 371.51 |
| 8. | 5056 | 475.62 | 458.66 | 126.33 | 435.61 |
| 9. | 5122 | 483.85 | 508.39 | 280.55 | 425.36 |
| 10. | 5112, 5113 | 796.53 | 460.62 | 368.12 | 800.21 |

TABLE 3

Voltage Collapse MVA Margins
(901 buses and 2251 lines system)

| Case | Margin (GCF) | Margin (CPF) |
|---|---|---|
| 1. | 118.52 | 106.88 |
| 2. | 209.80 | 240.88 |
| 3. | 151.41 | 299.03 |
| 4. | 245.72 | 417.51 |
| 5. | 372.42 | 417.70 |
| 6. | 374.21 | 426.43 |
| 7. | 345.40 | 432.10 |
| 8. | 456.88 | 517.06 |
| 9. | 541.00 | 544.33 |
| 10. | 552.56 | 602.34 |

TABLE 4

CPU Time
(901 Buses and 2251 lines system)

| Case | CPU (sec.) (GCF) | CPU (sec.) (CPF) |
|---|---|---|
| 1. | 4.89 | 13.92 |
| 2. | 4.87 | 16.12 |
| 3. | 4.86 | 26.28 |
| 4. | 4.92 | 47.54 |
| 5. | 4.89 | 57.42 |
| 6. | 5.51 | 50.68 |
| 7. | 4.86 | 53.16 |
| 8. | 4.85 | 60.69 |
| 9. | 5.51 | 57.03 |
| 10. | 4.89 | 70.07 |

Accordingly, from viewing Tables 1–4 it can be seen that the method of the present invention accomplishes or surpasses the best that is offered in known methods, without the significant tradeoffs that existing methods exhibit.

Further, it can be seen that the efficiency and reliability of the present invention may be viewed as finding a curves "surrogate" nose point" for which the MVAr, MW, or MVA distance to voltage collapse is calculated. Thus while the underlying solution mechanism is the continuation technique, the method does not compute and trace the P-V curve, it utilizes a generalized curve fit to compute a good equivalent nose point.

It is to be understood that many variations of the above described invention may be practiced without departing from the spirit and scope of the present invention. Further, it is not intended that the present invention be limited by the preferred embodiment recited detailed description, but rather only by the claims appended hereto.

What is claimed is:

1. A method for Voltage Stability Analysis of a bulk power supply system, comprising the following steps:

A. selecting at least two contingencies of a plurality of contingencies of the bulk power supply system;

B. screening and ranking the contingencies based on a predetermined ranking algorithm and generating a voltage collapse index;

C. approximating a stable branch of the bulk power supply system based on the screened and ranked contingencies of step B;

D. creating a voltage versus power curve by determining a plurality of stable equilibrium points on the curve;

E. using the plurality of determined stable equilibrium points to create and fit the approximate stable branch of step C;

F. calculating an approximate voltage collapse point for use in conjunction with the voltage collapse index.

2. A method according to claim 1 comprising the additional steps of:

E. Using a generalized curve fit to compute a nose point for which MVAr, MW or MVA distances to voltage may be calculated; and F. calculating the MVAr, MW or MVA distances to voltage based on the generalized curve fit.

3. A method according to claim 1 comprising the additional steps of:

E. using a generalized curve fit to compute a nose point for which MVAr and MVA distances to voltage may be calculated; and F. calculating the MVAr and MVA distances to voltage based on the generalized curve fit.

4. A method according to claim 1, wherein said plurality of stable equilibrium points is three stable equilibrium points.

5. A method for Voltage Stability Analysis of a bulk power supply system comprising the following steps, according to the following defined relationship:

A. selecting at least two contingencies of a plurality of contingencies of the bulk power supply system;

B. screening and ranking the contingencies based on a predetermined ranking algorithm;

C. calculating a stable branch of the bulk power supply system based on the screened and ranked contingencies of step B according to:

$$\lambda = a_n x^n + \ldots + a_1 x +$$

D. creating a voltage versus power curve for active power and reactive power by determining a plurality of stable equilibrium points on the curve according to:

$$f(x,\lambda) = F(x) + \lambda b = 0$$

D. using the plurality of determined stable equilibrium points to create and fit an approximate stable branch according to:

$$\lambda_i = a_1 x_i^2 + a_2 x_i + a_3.$$

E. calculating an approximate voltage collapse point according to:

$$x_i^* = -\frac{a_{2i}}{2a_{1i}}, i = 1, 2, \ldots, n_c, \text{ and}$$

F. creating a voltage collapse index $\lambda^*$ according to:
    where $$\lambda_i^* = -\frac{a_{2i}^2}{2a_{1i}} + a_3.$$

and $n_c$ is a number of buses where load is changed, the number of busses being greater than one.

6. A method according to claim 5, wherein said plurality of stable equilibrium points is three stable equilibrium points.

* * * * *